S. J. SMITH.
FERTILIZER.
APPLICATION FILED JUNE 24, 1921.

1,402,102.

Patented Jan. 3, 1922.

Inventor.
Silas J. Smith
by H. J. S. Dennison
Atty

UNITED STATES PATENT OFFICE.

SILAS JOHN SMITH, OF CHATHAM, ONTARIO, CANADA.

FERTILIZER.

1,402,102.     Specification of Letters Patent.     Patented Jan. 3, 1922.

Application filed January 24, 1921. Serial No. 439,398.

*To all whom it may concern:*

Be it known that I, SILAS J. SMITH, a subject of the King of Great Britain, and resident of the city of Chatham, county of Kent, Province of Ontario, in the Dominion of Canada, have invented certain new and useful Improvements in Fertilizers, described in the following specification and illustrated in the accompanying drawings, that form part of the same.

The objects of this invention are to produce a fertilizer rich in ammonia and potassium in form immediately available to young plants and which will maintain a sufficient supply to continue feeding the growing and maturing plants.

A further object is to utilize to advantage the residual syrup produced by the removal of the crystallizable sugar from the concentrated liquor obtained from sugar pulp.

Figure 1:
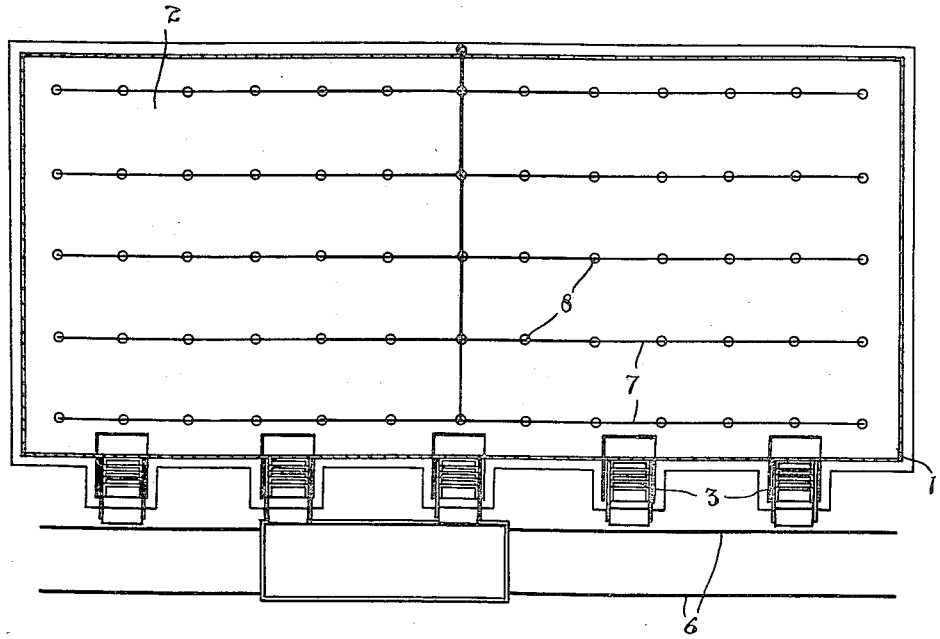

In the accompanying drawings Figure 1 is a diagrammatic plan view of a drying shed.

Figure 2:
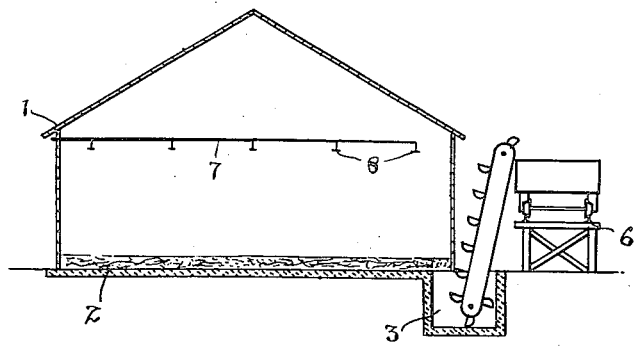

Figure 2 is an end sectional elevation.

In carrying this invention into effect a base of air dried peat, garbage tankage or humus is saturated with the fertilizer bearing liquor. This is carried into effect by providing buildings in the form of drying sheds 1 which are of ample dimensions provided with a level floor 2 of concrete. Elevator pits 3 are arranged along one or both sides of the building and these are 4 or 5 feet in depth and are adapted to receive the dried fertilizer which is lifted therefrom by suitable portable bucket elevators.

Along either or both sides of the building are arranged elevated trackways 6 to facilitate unloading of the peat base from gondola cars. This material when unloaded is spread uniformly over the floor for a depth of about 10 inches and from time to time it is agitated or turned over by suitable implements such as plows or cultivators.

Several feet above the floor are arranged a series of pipes 7 which are provided with spraying nozzles 8 every few feet. These pipes are adapted to carry the liquid fertilizer which is known as "Steffens waste water" which is a residue product from the refining of beet sugar and analyzes, moisture det. at 100° C. about 29.21%, nitrogen 3.89% and potassium 8.82%.

During the months of July, August and September the air dried peat litter, or garbage tankage, is spread over the floor to a depth of about 10" and from October on to the following June this litter is treated with applications of the above liquor which is available about the first of October as the sugar beet refining commences about that period.

The liquor is pumped through the pipes 7 and sprayed over the litter and after being left for a few days to absorb into the litter, the mass is then agitated and turned by the use of suitable implements. This treatment is continued until about June and in July scrapers are put on the floor and the material is gathered into the pits 3 from which it is loaded into the cars to be taken away for the fall fertilizing or it may be stored and the sheds are then ready to receive the new charge.

The peat or other absorbent organic base contains about 2% ($NH_3$) ammonia in slowly available form and its condition is greatly improved by the continued agitation during the year. The absorbent material becomes thoroughly impregnated with the ammonia and potassium in the liquor applied from time to time and the resultant product analyzes from 6% to 10% ammonia, and 8% to 12% potassium. The ammonia is about 75% immediately available and the potassium is water soluble which produces ideal conditions for fertilizer. There is plenty of immediately available ammonia which with the potassium starts the plants off well and there is also ample more slowly available ammonia in the base material to feed the plants to maturity.

It is found in practice that the dried litter absorbs approximately 3 to 5 tons of liquor to 1 ton of litter in a season's preparation in the manner described.

What I claim as my invention is:—

1. A method of making fertilizer, consisting in periodically spraying an air dried absorbent organic litter with a liquor containing ammonia and potassium and agitating the mixture between the spraying periods.

2. A method of making fertilizer, consisting in laying a bed of air dried humus of vegetable matter in a layer over a drying area, then spraying said vegetable matter with a liquor containing ammonia and potassium, allowing same to be absorbed, then agitating or turning the vegetable material, then repeating the spraying and turning.

3. A method of making fertilizer, consisting in laying over a floored surface a layer of dried vegetable litter about 10 inches deep, then spraying the litter periodically with a liquor in the form of a residual syrup obtained from sugar pulp following the removal of the crystallizable sugar, then turning over the sprayed material, then respraying and continuing this treatment until approximately 3 to 5 tons of the liquor have been fed to approximately 1 ton of vegetable matter.

4. A method of making fertilizer, consisting in laying a stratum of vegetable litter over a drying area in the fall, then subjecting the same to a saturating treatment of a liquor rich in ammonia and potassium continuously mixing the material for several months during the saturating thereof and finally removing the loaded material.

SILAS JOHN SMITH.